United States Patent
Jones, Jr. et al.

(10) Patent No.: US 7,114,351 B2
(45) Date of Patent: Oct. 3, 2006

(54) ALL ELECTRIC LNG SYSTEM AND PROCESS

(75) Inventors: Richard Jones, Jr., Katy, TX (US);
Patrick B. Ward, Katy, TX (US)

(73) Assignee: BP Corporation North America Inc., Warrenville, IL (US)

( * ) Notice: Subject to any disclaimer, the term of this patent is extended or adjusted under 35 U.S.C. 154(b) by 0 days.

(21) Appl. No.: 10/674,250

(22) Filed: Sep. 29, 2003

(65) Prior Publication Data
US 2004/0129020 A1 Jul. 8, 2004

Related U.S. Application Data

(60) Provisional application No. 60/414,806, filed on Sep. 30, 2002.

(51) Int. Cl.
*F25J 1/00* (2006.01)
*F02C 6/00* (2006.01)
*F02G 1/00* (2006.01)

(52) U.S. Cl. .......................... 62/611; 60/772; 60/39.182

(58) Field of Classification Search ............... 62/611, 62/612, 613; 60/772, 39.182
See application file for complete search history.

(56) References Cited

U.S. PATENT DOCUMENTS

| | | | |
|---|---|---|---|
| 4,566,885 A * | 1/1986 | Haak | 62/613 |
| 4,755,200 A | 7/1988 | Liu et al. | |
| 4,907,405 A * | 3/1990 | Polizzotto | 60/772 |
| 5,139,548 A | 8/1992 | Liu et al. | |
| 5,295,350 A | 3/1994 | Child et al. | |
| 5,689,141 A * | 11/1997 | Kikkawa et al. | 290/52 |
| 6,389,844 B1 | 5/2002 | Klein Nagel Voort | |
| 6,449,984 B1 * | 9/2002 | Paradowski | 62/613 |
| 6,640,586 B1 | 11/2003 | Hahn et al. | |
| 6,658,891 B1 * | 12/2003 | Reijnen et al. | 62/612 |

FOREIGN PATENT DOCUMENTS

| | | |
|---|---|---|
| AU | 0235610 | 10/2002 |
| DE | 10119761 | 10/2002 |
| WO | 0140725 | 6/2001 |

OTHER PUBLICATIONS

Bauer, H., "A Novel Concept", Hydrogen Engineering (May 2002) p. 59 et seq.*
Bauer, H., "A Novel Concept", Hydrocarbon Engineering (May 2002) p. 59 et seq.
Fallaize, et al., "Next Generation LNG—eDrive" AICHE Spring Mtg. (Mar. 2002).
PCT Search Report PCT/US03/30552.
Murtaza Khakoo, Beatrice Fischer and Jean-Christophe Raillard, "The Next Generation of LNG Plants," LNG 13 Conference, May 14, -17, 2001, Seoul, Korea.
Siemens Aktiengesellschaft, "The All Electric Driven LNG Plant," May 9, 2001, 1st BP Upstream Energy Conference, Houston, Texas.

* cited by examiner

*Primary Examiner*—William C. Doerrler
(74) *Attorney, Agent, or Firm*—John L. Wood; F. Lindsey Scott

(57) ABSTRACT

A reduced carbon dioxide emissions system and method for providing power for refrigerant compression and shared electrical power for a light hydrocarbon gas liquefaction process.

15 Claims, 1 Drawing Sheet

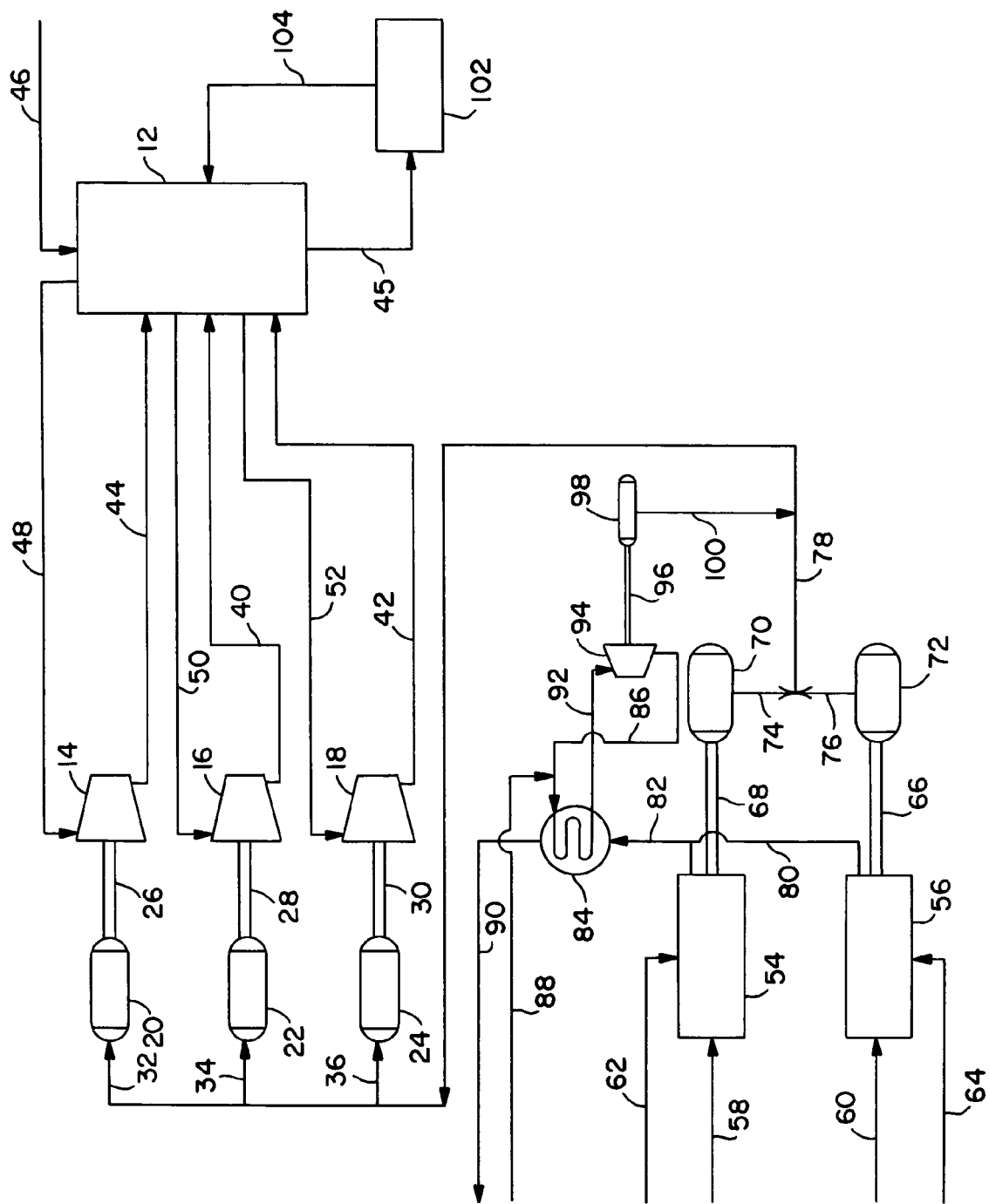

ALL ELECTRIC LNG SYSTEM AND PROCESS

RELATED APPLICATIONS

This application is entitled to and hereby claims the benefit of the filing date of U.S. Provisional Application No. 60/414,806 filed Sep. 30, 2002.

FIELD OF THE INVENTION

This invention relates to the liquefaction of light hydrocarbon gases, such as natural gas, by cooling the light hydrocarbon gases to a temperature at which they become liquid. The liquefaction process is carried out using substantially all electrically powered equipment.

The invention further comprises a reduced carbon dioxide emission system for producing power for refrigerant compression and shared electrical power for a light hydrocarbon gas liquefaction process.

Typically the light hydrocarbon gas is natural gas, which may have been treated to at least partially remove acid gases and dewatered, from which at least a portion of the hydrocarbon gases heavier than about $C_3$ may have been removed.

BACKGROUND OF THE INVENTION

Historically, plants for the liquefaction of light hydrocarbon gases have used gas turbines or steam turbines to drive the refrigerant compressors. The most frequently liquefied light hydrocarbon gas is natural gas. Such processes are typically referred to LNG (liquid natural gas) processes. Such processes using fossil fuel fired turbines or steam turbines have been dependent upon the size of the refrigerant compressors for the operation of the process. In other words, the size of the refrigerant compressors has been dictated by the power output of the turbines whose power fluctuated with changes in the ambient conditions on a day-to-day, day-to-night and season-to-season basis. This introduced undesirable variations into the LNG process since a constant flow of compressed refrigerant could not be assured. The fossil fuel fired turbines are difficultly adjusted to overcome these changes and as a result the operation of the LNG process has been less efficient and has produced less LNG over defined periods of time. Accordingly, an improved method for the operation of LNG processes has been sought.

SUMMARY OF THE INVENTION

According to the present invention, improved efficiency is accomplished by a reduced carbon dioxide emissions method for providing power for refrigerant compression to a light hydrocarbon gas liquefaction process, the method comprising: a) providing electrical power for the light hydrocarbon gas liquefaction process from at least one source; and, b) compressing a low-pressure refrigerant to an increased pressure in at least one refrigerant compressor driven by an electric motor powered with the electrical power from a).

In embodiments, improved efficiency is accomplished by a reduced carbon dioxide emissions method for providing power for refrigerant compression and shared electrical power to a light hydrocarbon gas liquefaction process, the method comprising: a) providing at least a portion of electrical power for the light hydrocarbon gas liquefaction process from at least one electrical generator driven by at least one fossil fuel-fired gas turbine; and, b) compressing a low-pressure refrigerant to an increased pressure in at least one refrigerant compressor driven by an electric motor powered by electrical power generated by the at least one electrical generator.

The invention further comprises an improved efficiency, reduced carbon dioxide emissions system for providing power for refrigerant compression to a light hydrocarbon gas liquefaction process, the system comprising: a) an electrical power supply for the light hydrocarbon gas liquefaction process; and b) a low-pressure refrigerant compressor driven by an electrical motor electrically connected to the electrical power supply.

In embodiments, the invention further comprises an improved efficiency, reduced carbon dioxide emissions system for providing power for refrigerant compression and shared electrical power to a light hydrocarbon gas liquefaction process, the system comprising: a) at least one electrical generator driven by a fossil fuel fired turbine and operable to provide an electrical power supply for the light hydrocarbon gas liquefaction process; and, b) a low-pressure refrigerant compressor driven by an electrical motor electrically connected to the electrical power supply for the light hydrocarbon gas liquefaction process and powered by electrical power from the electrical power supply.

BRIEF DESCRIPTION OF THE FIGURE

The FIGURE is a schematic diagram of a process and system according to the present invention.

DESCRIPTION OF THE PREFERRED EMBODIMENTS

In the description of the FIGURE, numerous pumps, compressors, valves and the like necessary to accomplish the flows as shown have not been included for simplicity.

In the FIGURE, a light hydrocarbon gas liquefaction system and process is shown. As previously mentioned, such systems and processes are most commonly used for natural gas liquefaction and are referred to as LNG processes. As shown in the FIGURE, liquefaction plant facilities 12 are supplied with compressed refrigerant by three refrigerant compressors 14, 16 and 18 (typically at pressures from about 1 to about 75 bara). Electric motors 20, 22 and 24 power these refrigerant compressors via shafts 26, 28 and 30, although other linkages could be used as desired. While three electric motors and refrigerant compressors are shown as an illustration, fewer or more could be used. It will be further understood that the liquefaction plant facilities may include a plurality of refrigeration units selected from a wide variety of light hydrocarbon liquefaction gas processes that are known and could be used. Such processes may vary from multiple pure refrigerant, multi-refrigerant or combinations thereof, using single-stage or multiple stage refrigeration vessels and the like.

The present invention is considered to be effective to supply compressed refrigerant and electrical power to all such processes. Not only can the refrigerant be supplied in desired quantities at variable rates and at variable pressures, but each of the refrigerant compressors can deliver compressed refrigerant at a selected viable pressure and at a selected viable rate. While not shown, the various refrigerant compressors can provide compressed refrigerant to the liquefaction unit at different inlet points, at different pressures and if desired even with different refrigerants. Flow lines 40, 42 and 44 have been shown to accomplish these deliveries and it is believed to be well within the skill of those skilled in the art to route the compressed refrigerant to the desired section or sections in facilities 12. As shown, compressed refrigerant is delivered from refrigerant compressors 14, 16 and 18 through lines 40, 42 and 44 to facilities 12. Only a schematic showing of the delivery of the compressed refrigerant to facilities 12 has been made since, as noted above, the refrigerants can be delivered at varied inlet points, at varied rates and at varied pressures as desired.

Further in the schematic showing of facilities 12, a light hydrocarbon gas inlet 46 is shown through which a light hydrocarbon gas, which has desirably been dewatered and from which acid gases and hydrocarbons heavier than about $C_3$ have been removed as required is charged to unit 12. The removal of these components is well known and particularly the removal of the heavier hydrocarbon gases is well known. These gases may desirably be removed to prevent their freezing in the passageways in the colder sections of refrigeration unit 12, because of their increased value as a stand alone product, because of a desire to market a liquefied natural gas product which falls within pipeline specifications for BTU content and the like. The liquefied light hydrocarbon gas (LNG) is recovered from facilities 12 via a line 45. The recovered LNG is passed via line 45 to LNG storage and export facilities 102 with boil-off gas being passed via a line 104 to facilities 12. Such variations are well known to those skilled in the art.

Gaseous spent refrigerant is recycled via lines 48, 50 and 52 to refrigerant compressors 14, 16 and 18 respectively.

Turbines 54 and 56 are shown to provide electrical power for the operation of the light hydrocarbon gas liquefaction process. Turbines 54 and 56 are turbines, as well known to the art, such as General Electric Frame 7 turbines or the like. These turbines typically include an air compression system such as an axial or a centrifugal compressor and are fueled with light hydrocarbon gases. Compressed air is charged via lines 58 and 60, and hydrocarbon gases charged via lines 62 and 64, at a suitable pressure (typically from about 350 to about 800 psi) and combusted in a combustion zone to produce a hot combustion gas typically at a temperature from about 2800 to about 3000° F. and a pressure from about 350 to about 800 psi which is passed to an inlet (not shown) of the turbine to drive the turbine with the hot inlet gases being discharged as low-pressure, high-temperature gases (typically at a temperature from about 800 to about 1600° F. and a pressure from about 15 to about 100 psig) through lines 80 and 82 respectively. The hot exhaust gases are passed to a heat exchanger 84 where they are passed in heat exchange relationship with either water supplied through a line 88 or low-pressure steam supplied through a line 86 to produce high-pressure steam that is recovered through a line 92. The exhaust gases (typically at a temperature from about 180 to about 200° F.) after heat exchange are passed with suitable processing to discharge through line 90. The high-pressure steam is passed to a turbine or expander 94 which is shaft coupled via a shaft 96 to an energy recovery generator 98 which produces additional electrical power which is recovered through a line 100. This electrical power is added to the power grid to power the light hydrocarbon gas liquefaction process.

The turbines, as shown, are shaft coupled or otherwise coupled to generators 70 and 72 by shafts 66 and 68. The electric generators produce power which is recovered as shown through lines 74 and 76 and is shown passed via a line 78 to power the electric motors 20, 22, and 24 used to power turbines 14, 16 and 18. The electric power is supplied to generators 20, 22, and 24 through lines 32, 34 and 36 respectively. While two turbines have been shown as illustrative, fewer or more could be used.

While the process and the system have been discussed and shown schematically, it is pointed out that considerable variations in the process and system are possible. Electrical motors have variable power ratings at different electrical supply conditions, which permit steady operation of the refrigerant compressors at desired conditions during varied ambient temperature conditions, varied feed gas, varied air inlet temperatures to the turbines and the like. The electric motors permit certain variations, which can be made by varying the current to the motor and accordingly can produce the compressed refrigerant at desired but somewhat variable rates and pressures. This permits operation of the light hydrocarbon gas liquefaction process at a relatively steady state and it also permits a reduction or increase in the quantity or pressure of the compressed refrigerant as a function of variables in the liquefaction process such as variations in the feed quantity available for liquefaction and the like. Fossil fuel turbine driven refrigerant compressors do not permit this flexibility and are vulnerable to varied power outputs as a function of ambient air temperature and the like.

The generation of the electrical power by the combustion of fossil fuel to drive the turbines results in the production of enough electrical power to operate the entire liquefaction process in many instances. Further, while it is not economically feasible to maintain additional fossil fuel fired turbines and compressors to replace a fossil fuel fired turbine driving a refrigerant compressor, which suddenly fails or requires maintenance, it is possible and economically feasible to maintain an additional fossil fuel fired turbine on standby with an electric generator to replace one of the turbines shown for electrical power generation. There are many reasons why it is more economical to maintain the fossil fuel fired turbine in conjunction with an electrical generator. For instance, the start up of the fossil fuel fired turbines in conjunction with an electrical generator is much easier than with a refrigerant compressor. Thus, the supply of electrical power can be resumed much more quickly than a second turbine/refrigerant compressor can be started.

Further the turbines, as shown, are operated so that the exhaust gas which is at a relative high-temperature (typically from about 800 to about 1600° F.) but low-pressure as discharged from the turbines, is passed to a heat exchanger to generate high-temperature steam (typically at a temperature from about 450 to about 520° F. and at a pressure from about 400 to about 1200 psi) which can be used to drive a turbine and an additional generator to produce electrical power which is recovered through line 100 and combined with the electrical power on the grid for the operation of the liquefaction process.

The system includes the ability to add additional turbines, compressors and generators to provide more electric power on short notice. The ease of start up and operation of an additional refrigerant compressor and electric motor enables the expansion of the refrigeration liquefaction process as well as insuring continuous operation. In many instances, the expansion of the capacity of such liquefaction processes is accomplished by adding an additional train of equipment and an additional liquefaction vessel so that two refrigeration vessels are used to produce liquefied light hydrocarbon gas rather than one. Such expansions are greatly facilitated when the entire plant is operated by internally generated electrical power.

Further the operation of the process and system as discussed above results in up to a sixty percent reduction in the amount of carbon dioxide emitted to the atmosphere by comparison to a process which uses light hydrocarbon gas fueled turbines to drive refrigerant compressors with the exhaust gas then being discharged to the atmosphere without heat recovery and with electrical power generated by the combustion of fossil fuels on or off site. In accordance with the present invention, the amount of $CO_2$ discharged to the atmosphere may be reduced by up to about 60 percent. For embodiments where power is provided by use of a fossil fuel fired turbine, the reduction is preferably at least about 35 percent and typically is from about 40 to about 60 percent.

Further by the process of the present invention, in the event that a failure occurs in one or more of the turbines, it is possible to supplement the available electrical power from available commercial power sources. In many parts of the world, electrical power is readily available from public utilities and the like and can be drawn upon as required to maintain operation of the liquefaction process during repair or start up of equipment. The use of such offsite power can be minimized, as discussed above, by maintaining one or more fossil fuel fired turbines and generators ready for immediate use in the event of a failure of any kind in the turbines and generators used for the supply of electrical power on a regular basis.

While it has been indicated above that the turbines and generators are sized to generate the electrical power for the entire process, it is to be understood that many compressors and the like may be driven by high-pressure process streams where such streams are available and are desirably reduced to lower pressures with the corresponding compression of other streams which are desirably raised to increased pressures. Such compressors may be powered by either the high-pressure streams alone or by compressors that utilize the energy available in the high-pressure streams supplemented with electrical motors powered by the electrical grid. The electrical grid as referred to herein is preferably the electrical network for the liquefaction plant, but electrical power employed in accordance with the present invention may also be obtained in whole or part from an external power source, such as a municipal power grid or system.

In summary, it is pointed out that the system and method discussed above are effective to produce sufficient electrical power for the full operation of the liquefaction process, permit more reliable operation and permit operation over varied compressed refrigerant requirements both as to quantity and pressure, provide the opportunity for reliable backup in the form of additional units which are available when needed and provide for the possibility of supplemental electrical power from publicly available sources on an emergency basis. These advantages greatly facilitate the production of a steady stream of liquefied light hydrocarbon gas from the process at improved process volumes.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

Having thus described the invention, we claim:

1. An improved efficiency, reduced carbon dioxide emissions method for providing internally generated electric power for refrigerant compression and shared electrical power for a light hydrocarbon gas liquefaction process, the method consisting essentially of:

a) providing at least a portion of the electrical power for the refrigerant compression and for the light hydrocarbon gas liquefaction process from at least one electrical generator driven by at least one fossil fuel fired turbine, the at least one fossil fuel fired turbine being fueled by a compressed air stream and a light hydrocarbon gas stream and producing a high-temperature, high-pressure gas stream to power the turbine and discharge a high-temperature exhaust gas stream;

b) passing the high-temperature exhaust gas stream to heat exchange with water or low-pressure steam to produce a higher pressure steam stream;

c) passing the higher pressure steam stream to a steam turbine to drive at least one energy recovery electrical generator to produce electrical power;

d) compressing a low-pressure refrigerant to an increased pressure in at least one refrigerant compressor driven by an electric motor powered by electrical power generated by the at least one electrical generator or the at least one energy recovery electrical generator; all of the required electrical power for the refrigerant compression and shared electrical power for the light hydrocarbon gas liquefaction process being supplied by the at least one electrical generator and the at least one energy recovery generator; and, e) providing and maintaining in condition for quick substitution for the at least one generator driven by the at least one fossil fuel fired turbine, at least one standby generator driven by at least one standby fossil fuel fired turbine.

2. An improved efficiency, reduced carbon dioxide emissions system for providing internally generated electric power for refrigerant compression and shared electrical power for a light hydrocarbon gas liquefaction process, the system consisting essentially of:

a) at least one electrical generator driven by a fossil fuel fired turbine fueled by a compressed air stream and a light hydrocarbon gas stream to produce a high temperature exhaust gas stream and operable to provide an electrical power supply for the light hydrocarbon gas liquefaction process;

b) a line for passing the high-temperature exhaust gas stream to heat exchange with water or low-pressure steam to produce a higher pressure steam stream;

c) a line for passing the higher pressure steam stream to at least one steam turbine having a higher pressure steam inlet and a low pressure steam outlet, the steam turbine being used to drive at least one energy recovery electrical generator to produce electrical power; d) a low-pressure refrigerant compressor driven by an electrical motor in electrical communication with the electrical power supply for the light hydrocarbon gas liquefaction process and powered by electrical power from the electrical power supply, the electrical power supply for the refrigerant compressor and light gas liquefaction process consisting of electrical power from the at least one electrical generator and the at least one energy recovery electrical generator; and, e) at least one standby fossil fuel fired turbine operatively connected to a generator and adapted for quick start up to substitute the standby fossil fuel fired turbine and generator for the at least one generator driven by a fossil fuel fired turbine when required for emergency power or when deemed necessary or desirable.

3. The method of claim 1 wherein the light hydrocarbon gas is natural gas.

4. The method of claim 1 wherein the produced electrical power is placed on the power grid for the light hydrocarbon gas liquefaction process.

5. The method of claim 1 wherein all of the refrigerant compressors are driven by electric motors.

6. The system of claim 2 wherein the at least one electrical generator produces substantially all of the electrical power required for the light hydrocarbon liquefaction process.

7. The system of claim 2 wherein the system includes a plurality of electrical generators.

8. The system of claim 2 wherein the system includes a plurality of turbines.

9. The system of claim 2 wherein each fossil fuel fired turbine includes a high-pressure air inlet into a combustion zone from which a high-temperature, high-pressure combustion gas stream is passed to an inlet to the turbine to drive the turbine and produce a high-temperature, low-pressure exhaust gas stream discharged through an exhaust gas outlet from the turbine.

10. The system of claim 9 wherein the system includes a heat exchanger in fluid communication with the exhaust gas outlet, the heat exchanger including an exhaust gas inlet and an exhaust gas outlet and a water or low-pressure steam inlet and a higher pressure steam outlet.

11. The system of claim 10 wherein the system includes a second electrical generator, operable to produce electrical power for the light hydrocarbon liquefaction process, and driven by a steam turbine having a higher pressure steam inlet and a low-pressure steam outlet.

12. The system of claim 11 wherein the steam turbine includes a reduced temperature steam outlet in fluid communication with the low-pressure steam inlet to the heat exchanger.

13. The method of claim 1 wherein the higher pressure steam stream is at a pressure from about 400 to about 1200 psi.

14. The system of claim 2 wherein the at least one steam turbine includes a reduced temperature steam outlet in fluid communication with the low-pressure steam inlet to the heat exchanger.

15. The system of claim 2 wherein the electrical power generated by the energy recovery electrical generator is in electrical communication with the electrical power supply and combined therewith.

* * * * *